(12) United States Patent
Lutz et al.

(10) Patent No.: US 7,557,169 B2
(45) Date of Patent: Jul. 7, 2009

(54) CAPPING ISOCYANATE PREPOLYMER OR POLYISOCYANATE/POLYETHER POLYOL OR POLYAMINE MIXTURE

(75) Inventors: Andreas Lutz, Altendorf (CH); Paul Rohrer, Herrliberg (CH); Hans Schönbächler, Willerzell (CH)

(73) Assignee: Dow Global Technologies, Inc., Midland, MI (US)

( * ) Notice: Subject to any disclaimer, the term of this patent is extended or adjusted under 35 U.S.C. 154(b) by 54 days.

(21) Appl. No.: 11/891,444

(22) Filed: Aug. 10, 2007

(65) Prior Publication Data

US 2008/0009589 A1  Jan. 10, 2008

Related U.S. Application Data

(62) Division of application No. 10/886,109, filed on Jul. 7, 2004, now abandoned.

(60) Provisional application No. 60/485,284, filed on Jul. 7, 2003.

(51) Int. Cl.
 *C08L 75/08* (2006.01)
 *C08L 63/02* (2006.01)
(52) U.S. Cl. ............... 525/460; 525/452; 525/454
(58) Field of Classification Search ............... None
 See application file for complete search history.

(56) References Cited

U.S. PATENT DOCUMENTS

| 4,659,779 | A | 4/1987 | Bagga et al. |
|---|---|---|---|
| 4,734,332 | A | 3/1988 | Bagga et al. |
| 4,739,019 | A | 4/1988 | Schappert et al. |
| 5,073,601 | A | 12/1991 | Mülhaupt et al. |
| 5,194,502 | A | 3/1993 | Saito et al. |
| 5,278,257 | A | 1/1994 | Mülhaupt et al. |
| 5,308,895 | A | 5/1994 | Gan et al. |
| 6,776,869 | B1 * | 8/2004 | Schenkel ............... 156/331.7 |
| 2005/0209401 | A1 | 9/2005 | Lutz et al. |
| 2006/0205897 | A1 | 9/2006 | Frick et al. |
| 2006/0276601 | A1 | 12/2006 | Lutz et al. |

OTHER PUBLICATIONS

Database WPI Section Ch, Week, 199121, Derwent Publications Ltd., London, GB; AN 1991-151142, XP002307834 & JP 03043481 Raytheon Co., Feb. 25, 1991-Abstract.
JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.

* cited by examiner

Primary Examiner—Robert Sellers

(57) ABSTRACT

The invention is a composition comprising applying to a substrate a stream of an adhesive comprising:
one or more epoxy resins;
one or more rubber modified epoxy resins;
one or more toughening compositions comprising the reaction product of one or more isocyanate terminated prepolymers and one or more capping compounds having one or more phenolic, benzyl alcohol, aminophenyl, or, benzylamino groups wherein the reaction product is terminated with the capping compounds;
one or more curing agents for epoxy resins and one or more catalysts which initiate cure at a temperature of about 100° C. or greater; and
optionally; fillers adhesion promoters, wetting agents or rheological additives useful in epoxy adhesive compositions;
wherein the adhesive composition has a viscosity at 45° C. of about 20 Pa·s to about 400 Pa·s.

The composition can be used as an adhesive and applied as a stream using a high speed streaming process.

14 Claims, No Drawings

CAPPING ISOCYANATE PREPOLYMER OR POLYISOCYANATE/POLYETHER POLYOL OR POLYAMINE MIXTURE

This application is a Divisional of prior application Ser. No. 10/886,109 filed Jul. 7, 2004, now abandoned. This application claims the benefit of U.S. Provisional application No. 60/485,284, filed Jul. 7, 2003.

BACKGROUND OF INVENTION

This invention relates to an epoxy based adhesive containing a toughening agent and a method of applying such adhesive using a streaming process.

Epoxy resin based adhesives are used to bond a variety of different substrates together. In the automotive industry, epoxy resin adhesives are used to bond certain parts together, and are known as structural adhesives. A structural adhesive is an adhesive which bonds parts of the body structure of an automobile together. The problem with epoxy resins as used in adhesive compositions is that the epoxy resins are somewhat brittle and subject to fracturing when impacted. This tendency to fracture can be reduced by the addition of toughening agents. The problem with the use of toughening agents is that such toughening agents tend to increase the viscosity of the composition and the increased viscosity limits the method and speed of application. Mülhaupt, U.S. Pat. No. 5,278,257 discloses an epoxy resin containing (a) copolymer based on at least one 1,3-diene and at least one polar, ethylenically unsaturated comonomer and (b) a phenol-terminated polyurethane, polyurea or polyurea urethane. The adhesives disclosed in Mülhaupt are excellent structural adhesives. Because these adhesives are very viscous, they are not useful in some high-volume applications which require high application speeds.

In particular these materials are applied generally as an extruded bead directly on the surface and have a viscosity of from about 150 to about 600 Pa·s. measured at 45° C. In another application these adhesives are applied using swirl techniques at a viscosity of about 100 Pa·s. The process of applying an adhesive using an extruded bead is too slow for many high speed applications. The swirl process is a faster application but is not ideal for high-volume structural applications.

What is needed is a process for applying structural adhesives based on epoxy resins wherein the adhesive can be applied fast and in high-volume.

SUMMARY OF INVENTION

The invention is a method of applying an adhesive composition comprising applying to a substrate a stream of an adhesive comprising:

A) one or more epoxy resin;

B) one or more rubber modified epoxy resins;

C) one or more toughening compositions comprising the reaction product of one or more isocyanate terminated prepolymers and one or more capping compounds having one or more bisphenolic, phenolic, benzyl alcohol, aminophenyl or, benzylamino moieties wherein the reaction product is terminated with the capping compounds;

D) one or more curing agents and one or more catalysts for epoxy resins which initiates cure at a temperature of about 100° C. or greater; and E) optionally; fillers, adhesion promoters, wetting agents or rheological additives useful in epoxy adhesive compositions;

wherein the adhesive composition has a viscosity at 45° C. of about 20 Pa.·s to about 400 Pa.·s. preferably 20 to about 150 Pa.·s. The isocyanate terminated prepolymer is the reaction product of an aliphatic polyisocyanate and a hydroxyl or amine terminated polyether wherein the polyether may contain urea or urethane linkages in the backbone. The capping compound comprises one or more aromatic or bisaromatic rings with one or more hydroxyl, amino, methyl amine or methylol groups attached to one or more of the aromatic rings. Where the capping compound contains more than one aromatic ring, the aromatic rings are bonded together through a carbon to carbon bond between two carbons on the aromatic rings, an alkylene, oxygen, carbonyl, carbonyloxy, or amido group and the aromatic rings may further be substituted with one or more alkyl, amino, alkylamino and/or hydroxyl groups provided such group does not interfere with the reaction of hydroxyl and/or amino groups with isocyanate groups. The reaction product has a crosslinking density such that the viscosity of the reaction product is as described herein at 45° C.

Further the invention is a method of applying the adhesive composition by applying it to a substrate in the form of a stream of the adhesive. This can performed using a high speed streaming apparatus.

The streamable adhesive can be applied at a speed of about 200 to about 400 millimeters (mm) per second. The adhesive used in the invention can be formulated to have relatively low viscosity yet provide a high strength bond.

DETAILED DESCRIPTION OF INVENTION

The toughening agents comprise the reaction product of one or more isocyanate terminated prepolymers with one or more capping agents, wherein the isocyanate used to prepare the prepolymer has aliphatic and/or cycloaliphatic groups. Preferably, the prepolymer has a molecular weight so as to result in a low viscosity adhesive composition. Preferably, the viscosity of the prepolymer is from about 20 Pa.·s. or greater, more preferably about 100 Pa.·s. or greater. Preferably, the prepolymer has a viscosity of about 1000 Pa.·s. or less and more preferably about 800 Pa.·s. or less. In order to achieve the desired viscosity of the toughening agent, the number of branches of the isocyanate prepolymer and the crosslink density of the ultimate reaction product must be kept low. The number of branches of the prepolymer is directly related to the functionality of the raw materials used to prepare the isocyanate terminated prepolymer. Functionality refers to the number of reactive groups in the reactants. Preferably the number of branches in the prepolymer is about 6 or less and more preferably about 4 or less. Preferably the number of branches is about 1 or greater and more preferably about 2 or greater. Crosslink density is the number of attachments between chains of polymers. At higher crosslink densities the viscosity of the reaction product is higher. The crosslink density is impacted by the functionality of the prepolymer and by the process conditions. If the temperature of the reaction to prepare the toughening agent is kept relatively low, crosslinking can be minimized. Preferably the crosslink density is about 2 or less and more preferably about 1 or less. Preferably, the molecular weight of the prepolymer is about 8,000 (Mw) or greater, and more preferably about 15,000 (Mw) or greater. Preferably, the molecular weight of the prepolymer is about 40,000 (Mw) or less, and more preferably about 30,000 (Mw) or less. Molecular weights as used herein are weight average molecular weights determined according to GPC analysis. The amount of capping agent reacted with the prepolymer should be sufficient to cap substantially all of the terminal isocyanate groups. What is meant by capping the terminal isocyanate groups with a capping agent is that the capping agent reacts with the isocyanate to place the capping agent on the end of the polymer. What is meant by substantially all is that a minor amount of free isocyanate groups are left in the prepolymer. A minor amount means an amount of the referenced feature or ingredient is present which does not impact in any significant way the properties of the composition. Preferably, the ratio of capping agent equivalents to isocyanate prepolymer equivalents is about 1:1 or greater, more preferably about 1.5:1 or greater. Preferably, the equivalents ratio of capping agent to isocyanate of prepolymer is about 2.5:1 or less and more preferably about 2:1 or less.

Preferably, the reaction product corresponds to one of the formulas I or II:

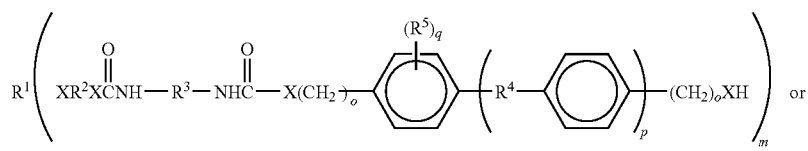

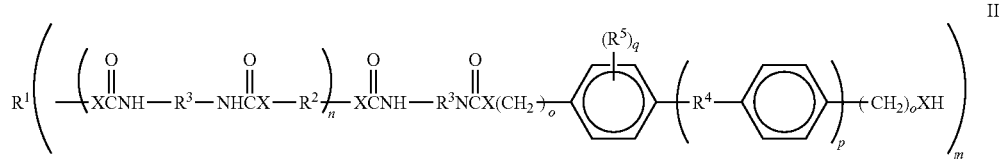

$R^1$ is independently in each occurrence a $C_{2-20}$ m-valent alkyl moiety;

$R^2$ is independently in each occurrence a polyether chain;

$R^3$ is independently in each occurrence an alkylene, cycloalkylene or mixed alkylene and cycloalkylene moiety, optionally containing one or more oxygen or sulfur atoms;

$R^4$ is a direct bond or an alkylene, carbonyl, oxygen, carboxyloxy, or amido moiety;

$R^5$ is independently in each occurrence an alkyl, alkenyl, alkoxy, aryloxy or aryloxy moiety with the proviso that if p=1, then q=0;

X is O or —$NR^6$ with the proviso that X is O where p is 1; and that where p is 0, X is O in at least one occurrence;

$R^6$ is independently in each occurrence hydrogen or alkyl;

m is independently in each occurrence a number of about 1 to about 6;

n is independently in each occurrence a number of 1 or greater;

o is independently in each occurrence 0 or 1 if p is 0 and 0 if p is 1;

p is independently in each occurrence 0, or 1; and q is independently in each occurrence a number of from 0 to 1.

The isocyanate terminated prepolymer corresponds to one of formulas III and IV

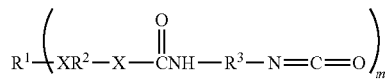

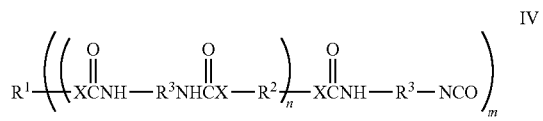

and capping compound corresponds to formula V

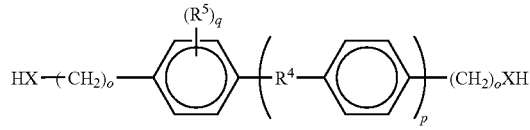

wherein $R^1$, $R^2$, $R^3$, $R^4$, $R^5$, m, n, o, p and q are as defined hereinbefore.

$R^4$ is preferably a direct bond or an alkylene, oxygen, carbonyl, carbonyloxy, or amido moiety. More preferably, $R^4$ is a direct bond or a $C_{1-3}$ straight or branched alkylene moiety.

Preferably $R^5$ is independently in each occurrence an alkyl, alkenyl, alkyloxy or aryloxy moiety with the proviso that if p=1 then q=0. More preferably $R^5$ is a $C_{1-20}$ alkyl, $C_{1-20}$ alkenyl, $C_{1-20}$ alkoxy or $C_{6-20}$ aryloxy moiety. More preferably, $R^5$ is a $C_{3-15}$ alkyl or $C_{2-15}$ alkenyl moiety.

Preferably, o is 0. Preferably, N is independently in each occurrence about 1 to about 3.

The polyether polyol or polyamine used to prepare the isocyantate terminated prepolymer of formula (III) can be any conventional polyether polyamine or polyol known to those skilled in the art. In order to prepare the prepolymer, the polyether polyol or polyether polyamine is reacted with an equivalents excess of a polyisocyanate in the presence of a polyaddition catalyst under conditions such that the hydroxyl or amino groups react with the polyisocyanate to form an isocyanate functional adduct of formula (III). If the starting compound is a polyether having two or more amino groups the prepolymer contains urea groups. If it is a polyether polyol the resulting prepolymer contains urethane groups. In order to produce the prepolymer of formula (IV) the starting compound is a $C_{2-20}$ mono or poly alcohol or amine. In this case the starting compound is reacted with a polyether polyol or a polyether polyamine and an equivalents excess of a polyisocyanate in the presence of a polyaddition catalyst under conditions such that an isocyanate functional prepolymer is prepared. Conventional polyaddition conditions are used for this reaction step. In prepolymer preparation, an excess of the polyisocyanate is reacted with the polyether polyol or polyamine so as to provide or result in the preparation of an isocyanate functional prepolymer. Preferably, the equivalent ratio of polyisocyanate with respect to the total of hydroxy and/or amino groups is about 1.5:1 or greater and more preferably about 2:1 or greater. Preferably, the equivalent ratio is about 3.5:1 or less and more preferably about 3:1 or less.

The polyether polyols or polyamines useful in the invention is any polyether or polyamine which can form a prepolymer with the polyisocyanate and when capped with the phenol provides a prepolymer having the desired viscosity characteristics described hereinbefore. The polyether polyols or polyamines comprise a series of hydrocarbon groups separated by oxygen atoms and terminated with hydroxyl, or primary or secondary amines (preferably primary amines). Preferably, $R^2$ is a polyalkylene polyether chain having a weight average molecular weight of about 400 to about 4,000. Preferably, the polyether is a polyalkylene ether, which is a series of alkylene groups alternating with oxygen atoms. Preferably, the polyalkylene polyether has a molecular weight of about 400 (Mw(weight average)) or greater, and more preferably about 1000 (Mw) or greater. Preferably, the polyalkylene polyether has a molecular weight (Mw) of 8000 or less, and more preferably 3000 (Mw) or less. Polyalkylene as used in this context refers to a polyether having repeating units containing straight or branched chain alkylene groups. Preferably, the alkylene group is from 2 to about 6 carbons, and can be straight or branched chain, more preferably from about 2 to about 4 carbon atoms and most preferably 3 to about 4 carbon atoms. Preferably, the alkylene groups are derived from ethylene oxide, propylene oxide, butylene oxide or tetrahydrofuran. Preferably, the polyether polyols or polyamines which are used to prepare the prepolymer have a functionality of about 2 to about 6, more preferably about 2 to about 4, even more preferably from about 2 to about 3 and most preferably about 2. The polyether polyols or polyamines may also contain the residue of an initiator compound used to initiate polymerization of the alkylene oxide or tetrahydrofuran to make the polyalkylene polyether via techniques known to those skilled in the art. In a preferred embodiment the polyether is derived from tetrahydrofuran.

In the formulas used herein $R^2$ represents the residue of a polyether segment of the polymers represented. As used herein residue means that the polyether remaining is that portion except for the end groups X which are separately identified in the formulas (I) to (IV).

The polyether residue preferably has a molecular weight (weight average) of about 400 or greater, more preferably about 1000 or greater and most preferably about 1500 or greater. The polyether residue preferably has a molecular weight of about 8000 or less, more preferably about 6000 or less and most preferably about 3000 or less.

Starting compounds which are useful to produce prepolymers of the formula II in this invention are compounds having about 1 to about 8, preferably about 2 to about 8, more preferably about 2 to about 4, most preferably about 2 to about 3 active hydrogens. Preferable starting compounds include, for example, alcohols, glycols, low molecular weight polyols, glycerin, trimethylol propane, pentaerythritol, glucosides, sugars, ethylene diamine, diethylene triamine, and the like. Particularly, suitable glycols include ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol and various hexane diols, mixtures thereof and the like. Preferred starting compounds are trifunctional such as trimethylol propane.

In the formulas used herein, $R^1$ is the residue of a starting compound or a polyaddition initiator for the polyether, respectively, well known to those skilled in the art. The starting compounds and initiators useful herein preferably correspond to the formula

$$R^1(XH)_m$$

wherein $R^1$, X and m are previously defined. Preferably the initiator is hydroxyl functional. Preferably $R^1$ is independently in each occurrence a $C_{2-20}$ m-valent alkyl group. More preferably $R^1$ is independently in each occurrence a $C_{2-8}$ m-valent alkyl group and even more preferably a $C_{2-6}$ alkyl group. $R^1$ is independently in each occurrence a 2 to 6 valent, more preferably 2 to 4 valent and most preferably 2 to 3 valent. Preferably X is O. Preferably, m is a number of about 2 to about 6, even more preferably a number of about 2 to about 4 and most preferably about 2 to about 3.

The isocyanates useful in preparing the prepolymer and toughening agent of the invention include all aliphatic polyisocyanates. Aliphatic is used herein means that the isocyanate has in its backbone moieties which are not aromatic, and preferably moieties of alkylene, cycloalkylene or a mixture thereof. Further, the aliphatic, such as alkylene and/or cycloalkylene, moieties may contain one or more oxygen or sulfur atoms. Poly is used herein means two or more. Polyisocyanates mean isocyanates which have on average two or more isocyanate groups. Preferably, the isocyanates are isocyanates having from about 2 to about 3 isocyanate groups on average and more preferably, on average, about 2 isocyanate moieties. Preferred polyisocyanates correspond to the formula

$$R^3-(NCO)_p$$

wherein $R^3$ is as defined hereinbefore. Preferably, $R^3$ is independently in each occurrence a $C_{1-20}$ alkylene, cycloalkylene or mixed alkylene and cycloalkylene moiety, optionally containing one or more oxygen or sulfur atoms in the alkylene and/or cycloalkylene chains. Mixed alkylene and cycloalkylene means a moiety that contains both straight and/or branched chains and cyclic alkylene rings. More preferably, $R^3$ is ethylene, trimethylene, tetramethylene, pentamethylene, hexamethylene, heptamethylene, octamethylene, decamethylene, dodecamethylene, tetradecamethylene, hexadecamethylene, octadecamethylene, eicosamethylene; moieties corresponding to the formulas:

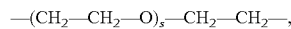
$$-(CH_2-CH_2-O)_s-CH_2-CH_2-,$$

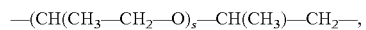
$$-(CH(CH_3-CH_2-O)_s-CH(CH_3)-CH_2-,$$

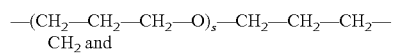
$$-(CH_2-CH_2-CH_2-O)_s-CH_2-CH_2-CH_2-CH_2 \text{ and}$$

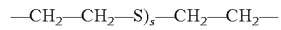
$$-CH_2-CH_2-S)_s-CH_2-CH_2-$$

in which s is independently in each occurrence 1 to 20; or cyclopenthalene, cyclohexalene, cyclohepthalene or two or more of such cycloalkylene groups bonded through a direct bond or bonded through an alkylene group.

Among preferred isocyanates are ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, tetradecamethylene diisocyanate, hexadecamethylene diisocyanate, octadecamethylene diisocyanate, eicosamethylene diisocyanate, cyclohexamethylene diisocyanate, cyclopenthalene diisocyanate, or cyclohepthalene diisocyanate, or bis-cyclohexalene, cyclohexylmethylene diisocyanate, and the like. A most preferred isocyanate is hexamethylene diisocyanate.

The capping agent useful in this invention is any phenol, benzyl alcohol, aromatic amine, or benzyl amine as described herein which is liquid or can be dissolved in the polyether used and which under defined reaction conditions herein reacts with the isocyanate groups of the prepolymer to cap the isocyanate groups.

Preferably, the capping agent is a phenol or a benzyl alcohol. In one preferred embodiment the phenol is an alkyl substituted phenol and preferably the alkyl group is a $C_{1-20}$ alkyl moiety, more preferably $C_{2-15}$, alkyl moiety and most preferably a $C_{8-12}$ alkyl moiety. Preferably, the phenols correspond to the following formula

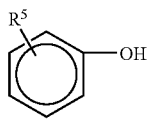

wherein $R_5$ is more preferably a $C_{1-20}$ alkyl moiety, even more preferably a $C_{2-15}$ alkyl and most preferably a $C_{8-12}$ alkyl moiety. The size and location of the alkyl group on the phenol must not hinder or prevent the reaction of the hydroxyl group on the phenol with the isocyanate moieties on the prepolymer. In another embodiment the phenol is a bisphenol. The bisphenol is structured such that the two aromatic rings are bonded to each other by a direct bond or through an alkylene, carboxyl, sulfinyl, sulfonyl or an alkyl substituted silane moiety. Preferably, the aromatic rings are bonded by a direct bond or an alkylene moiety. Preferably, the alkylene moiety is $C_{1-20}$ straight or branched chain, more preferably $C_{1-3}$ straight or branched chain alkylene. Preferably, the bisphenolic compound corresponds to the formula

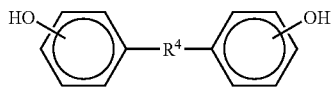

wherein $R^4$ is defined hereinbefore. Among preferred phenolic compounds are bisphenol A, bisphenol F, 3-(n-penta-8'-decenyl)phenol and o-allylphenol.

The toughening agent is prepared according to the following process. The first step is to determine whether the capping agent to be used is a solid or a liquid. If the capping agent to be used is a solid, it is dissolved in the polyether to be used. This process to dissolve the capping agent can be performed at elevated temperatures, i.e., temperatures necessary to dissolve the capping compound in the polyether. Preferably, such temperatures are about 100° C. or greater, and most preferably 130° C. or greater, and preferably 150° C. or less, and most preferably 140° C. or less. If the capping agent is liquid, it is added later in the process.

The polyether with solid capping agent compound dissolved therein is thereafter contacted with the polyisocyanate in the presence of a catalyst suitable for catalyzing the reaction between hydroxyl groups and isocyanate groups (a condensation catalyst). This contacting generally results in an exotherm. The capping agent and polyisocyanate are allowed to react until a prepolymer is formed which has isocyanate reactive moieties and substantially no hydroxyls present from the polyalkylene polyether. Generally, an equivalent excess of isocyanate is used to achieve this. Preferably, an excess of isocyanate equivalents of about 0.5 or greater is preferred, more preferably about 1 or greater is more preferred, and about 2.5 or less is preferred and more preferred is about 2 or less. Generally, this reaction will take about 30 minutes or more, more preferably about 60 minutes or more, preferably about 120 minutes or less, and more preferably about 100 minutes or less.

This reaction is performed in the presence of a condensation catalyst. Examples of such catalysts include the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines and tin mercaptides. Preferable condensation catalysts for this reaction are dibutyltin-dilaurate, tin-II-octoate and diazabicyclooctane. The amount of catalyst employed is generally between about 0.005 and about 5 percent by weight of the mixture catalyzed, depending on the nature of the isocyanate. More preferably, the catalyst is used in an amount of about 0.002 percent by weight of the reaction mixture or more, most preferably about 0.01 percent by weight of the reaction mixture or more. More preferably, the catalyst is used in an amount of about 0.2 percent by weight of the reaction mixture or less, and most about 0.05 percent by weight of the reaction or less.

If the capping compound is dissolved in the polyether, it is important to cool this reaction to keep the temperature below that temperature at which the prepolymer undergoes significant crosslinking. Preferably, the reaction mixture is cooled to a temperature of 90° C. or less, and more preferably 80° C. or less. If the capping agent to be used is a liquid after the completion of the reaction of the polyether with the polyisocyanate has occurred, the reaction mixture is cooled to a temperature below that temperature at which significant crosslinking could occur, and the capping agent is added to the reaction mixture. Preferably, the reaction mixture is cooled to a temperature of about 90° C. or less, and more preferably about 80° C. or less. The capping agent and isocyanate functional prepolymer are reacted for a sufficient time to cap the isocyanate moieties with the capping agent. Preferably, this reaction continues for a period of about 20 minutes or greater, more preferably about 50 minutes or greater, preferably the reaction is continued for a period about 120 minutes or less, and more preferably about 80 minutes or less. The catalyst from the previous step is present so as to catalyze the reaction of this step. The resulting reaction mixture is thereafter useful to prepare an epoxy adhesive formulation.

One component of the adhesive composition is an epoxide resin, such as those disclosed in U.S. Pat. No. 4,734,332, incorporated herein by reference, in particular column 2, line 66 to column 4, line 24. Epoxide resins which may be employed in the compositions of the invention are those which contain groups illustrated in the following formula

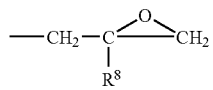

wherein $R^8$ is hydrogen or $C_{1-4}$ alkyl, preferably hydrogen or methyl and most preferably hydrogen. Preferably, the epoxy resin is a rigid epoxy resin or a mixture of rigid epoxy resins and flexible epoxy resins wherein no more than 10 percent by weight of the epoxy resins include a flexible epoxy resin. As used herein, rigid epoxy resins refer to epoxy resins having bisphenol moieties in the backbone of the epoxy resin. Representative of preferred bisphenol resins useful in this invention are those disclosed in U.S. Pat. No. 5,308,895 at column 8, line 6, incorporated herein by reference and represented by Formula 6. Preferably the rigid epoxy resin is a liquid epoxy resin or a mixture of a solid epoxy resin dispersed in a liquid epoxy resin. The most preferred rigid epoxy resins are bisphenol-A based epoxy resins and bisphenol-F based epoxy resins.

Flexible epoxy resins as used herein refer to epoxy resins having elastomeric chains in the backbone. Representative of such elastomeric chains are polyether chains which are preferably prepared from one or more alkylene oxides. Representative examples of these flexible epoxy resins are those described in U.S. Pat. No. 5,308,895 at column 8, line 9 and formula 9 and the description thereof following, incorporated herein by reference. Preferably the flexible epoxy resin contains in its backbone ethylene oxide, propylene oxide or a mixture thereof.

Another component is a rubber-modified epoxy resin. Preferably, the adhesive of the invention includes an epoxy-terminated adduct of an epoxy resin and a diene rubber or a conjugated diene/nitrile rubber. This adduct is suitably prepared in the reaction of a polyepoxide, a compound having an average of more than one epoxy group as described hereinbefore, with a carboxy-functional conjugated diene rubber or a conjugated diene/nitrile rubber. The diene rubber is a polymer of a conjugated diene monomer such as butadiene and isoprene. Butadiene rubbers are preferred. Conjugated diene/nitrile rubbers are copolymers of a conjugated diene and an ethylenically unsaturated nitrile monomer, of which acrylonitrile is the most preferred one. When a conjugated diene/nitrile rubber is used, at least one such rubber present in the composition contains less than about 30 weight percent polymerized unsaturated nitrile, and preferably no more than about 26 weight percent polymerized unsaturated nitrile. The rubber also contains terminal groups that will react with an epoxide to form a covalent bond thereto. Preferably, the rubber contains from about 1.5, more preferably from about 1.8, to about 2.5, more preferably to about 2.2, of such terminal groups per molecule, on average. Carboxyl-terminated rubbers are preferred. The rubber is preferably a liquid at room temperature, and preferably has a glass transition temperature of less than about −25° C., preferably from about −30 to about −90° C. The molecular weight ($M_n$) of the rubber is suitably from about 2000 to about 6000, more preferably from about 3000 to about 5000. Suitable carboxyl-functional butadiene and butadiene/acrylonitrile rubbers are commercially available from Noveon under the tradenames Hycar® 2000X162 carboxyl-terminated butadiene homopolymer and Hycar® 1300X31 carboxyl-terminated butadiene/acrylonitrile copolymer. A suitable amine-terminated butadiene/acrylonitrile copolymer is sold under the tradename Hycar® 1300X21. Examples of nitrile rubbers are Hycar® 1300X8, Hycar® 1300X13, Hycar® 1300X9, Hycar® 1300X18 and Hycar® 1300X31 carboxyl-terminated butadiene acrylonitrile copolymers, all commercially available from Noveon.

The conjugated diene or conjugated diene/nitrile rubber is formed into an epoxy-terminated adduct by reaction with an excess of a polyepoxide. A wide variety of polyepoxide compounds such as cycloaliphatic epoxides, epoxidized novolac resins, epoxidized bisphenol A or bisphenol F resins, butanediol polyglycidyl ether, neopentyl glycol polyglycidyl ether or flexible epoxy resins can be used, but generally preferred on the basis of cost and availability are liquid or solid glycidyl ethers of a bisphenol such as bisphenol A or bisphenol F. Halogenated, particularly brominated, resins can be used to impart flame retardant properties if desired. For forming the adduct, liquid epoxy resins (such as Bisphenol A-based epoxy resin, DER 331, available from The Dow Chemical Company) are especially preferred for ease of handling in making the adduct. Typically, the rubber and an excess of the polyepoxide are mixed together with a polymerization catalyst such as a substituted urea or phosphine catalyst, and heated to a temperature of about 100 to about 250° C. in order to form the adduct. Preferred catalysts include phenyl dimethyl urea and triphenyl phosphine. Preferably, enough of the polyepoxide compound is used that the resulting product is a mixture of the adduct and free polyepoxide compound.

The epoxy adhesive composition further contains a heat-activated curing agent. Preferably, that heat-activated curing agent is a nitrogen-containing heat-activated curing agent sometimes referred to as a latent curing agent. The curing agent (b) used in the new compositions may be any substance that remains inert towards epoxide resins below a certain "threshold" temperature, which is usually at least about 80° C., and preferably at least about 100° C. or above, but reacts rapidly to effect curing once that threshold temperature has been exceeded. Such materials are well known and commercially available and include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The adhesive composition useful in the invention can further contain other additives that are common in the adhesive art. Other customary additives which the mixtures according to the invention can contain are plasticizers, extenders, fillers and reinforcing agents, for example, coal tar, bitumen, textile fibers, glass fibers, asbestos fibers, boron fibers, carbon fibers, mineral silicates, mica, powdered quartz, hydrated aluminum oxide, bentonite, wollastonite, kaolin, silica aerogel or metal powders, for example, aluminum powder or iron powder, and also pigments and dyes, such as carbon black, oxide colors and titanium dioxide, fire-retarding agents, thixotropic agents, flow control agents, such as silicones, waxes and stearates, which can, in part, also be used as mold release agents, adhesion promoters, antioxidants and light stabilizers.

The epoxy resin or epoxide resin used in the invention is used in sufficient amount to give the desired adhesive and strength properties. Preferably, the epoxy resin is used in an amount of about 30 parts per hundred parts of adhesive composition or greater, more preferably about 40 parts per hundred parts of the adhesive composition or greater, and most preferably about 50 parts per hundred parts of adhesive composition or greater. The epoxy resin is preferably used in the amount of about 80 parts per hundred parts of adhesive composition or less, more preferably about 70 parts of epoxy resin per hundred parts of adhesive composition or less, and most preferably about 60 parts per hundred parts of adhesive composition or less.

Preferably the rubber-modified epoxy resins are used in an amount of about 0 parts per hundred parts of adhesive composition or greater, and more preferably about 5 parts per hundred parts of adhesive composition or greater, and most preferably about 10 parts per hundred parts of adhesive composition or greater. The rubber-modified epoxy resin is used in about 25 parts per hundred parts of adhesive composition or less, more preferably about 20 parts per hundred parts of adhesive composition or less, and more preferably about 15 parts per hundred of adhesive compositions or less. The curing agent is used in sufficient amount to cure the composition. Preferably, the curing agent is used in an amount of about 0 parts per hundred parts of adhesive composition or greater, more preferably about 3 parts per hundred parts of adhesive composition or greater, and most preferably about 5 parts per hundred parts of adhesive composition or greater. The curing agent is preferably used in amount of about 15 parts per hundred parts of adhesive composition or less, more preferably about 10 parts per hundred parts of adhesive composition or less, and most preferably about 8 parts per hundred parts of adhesive composition or less.

Fillers are used in sufficient amount to provide the desired rheological properties. Preferable fillers are used in an amount of about 0 parts per hundred parts of adhesive composition or greater, more preferably about 5 parts per hundred parts of adhesive composition or greater, and most preferably about 10 parts per hundred parts of adhesive composition or greater. The fillers are present in an amount of about 25 parts per hundred parts of adhesive composition or less, more preferably about 20 parts per hundred parts of adhesive composition or less, and most preferably about 15 parts per hundred parts of adhesive composition or less.

The toughening agent is present in sufficient amount to improve the performance of adhesive compositions containing it under dynamic load. Preferably, the toughening agents of the invention are present in an amount of about 5 parts per hundred parts of adhesive composition or greater, preferably about 7 parts per hundred parts of adhesive composition or greater and most preferably about 10 parts per hundred parts of adhesive composition or greater. Preferably, the toughening agent is present in an amount of about 35 parts per hundred parts of adhesive composition or less, preferably about 25 parts per hundred parts of adhesive composition or less and more preferably about 20 parts per hundred parts of adhesive composition or less.

The adhesive composition further comprises a catalyst for the cure of the reaction. Any suitable catalyst for an epoxy curing reaction may be used. Epoxy catalysts are present in sufficient amount to catalyze the curing reaction when exposed to temperatures at which the latent curing agent begins the cure. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). Preferably, the catalyst is present in the adhesive composition in the amount of about 0 parts per hundred parts of adhesive composition or greater, more preferably about 0.3 parts per hundred parts of adhesive composition or greater, and most preferably about 0.5 parts per hundred parts of adhesive composition or greater. Preferably, the epoxy curing catalyst is present in an amount of about 2 parts per hundred parts of adhesive composition or less, more preferably about 1.5 composition parts per hundred parts of adhesive or less, and most preferably about 1.3 parts per hundred parts of adhesive composition or less.

Preferably, the adhesive composition has a viscosity of about 150 Pa.·s or less, more preferably about 100 Pa.·s or less at 45° C. Preferably, the compositions have a viscosity of about 20 Pa.·s. or greater at 45° C., and most preferably about 30 Pa.·s. or greater at 45° C.

The adhesive composition can be applied by any techniques well known in the art. It can be applied by extruding it from a robot into bead form on the substrate, it can be applied using mechanical application methods such as a caulking gun, or any other manual application means, it can also be applied using a swirl technique. The swirl technique is applied using an apparatus well known to one skilled in the art such as pumps, control systems, dosing gun assemblies, remote dosing devices and application guns. Preferably, the adhesive is applied to the substrate using a streaming process. What is meant by applying by a streaming process means spraying a bead at a distance, nozzle to substrate, of about 3 to about 10 mm, using pressures of about 50 to about 300 bar, speeds of about 200 to about 500 mm/s, application temperatures from about 20° C. to about 65° C. and nozzle diameter of about 0.5 to about 1.5 mm. Equipment known to those skilled in art can be used for applying the adhesive via a steaming process and include pumps, control systems, dosing gun assemblies, remote dosing devices and application guns. Generally, the adhesive is applied to one or both substrates. The substrates are contacted such that the adhesive is located between the substrates to be bonded together. Thereafter, the adhesive composition is subjected to heating to a temperature at which the heat curable or latent curing agent initiates cure of the epoxy resin composition. Generally, this temperature is about 80° C. or above, more preferably about 100° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, aluminum, coated aluminum, plastic and filled plastic substrates.

The adhesive composition once cured preferably has an e-modulus of about 1200 MPa as measured according to the following tests. Preferably the e-modulus is about 1400 MPa or greater. Preferably, the cured adhesive demonstrates a tensile strength of about 30 MPa or greater, more preferably about 35 MPa or greater, and most preferably about 40 MPa or greater. Preferably, the adhesive demonstrates an elongation of about 3 percent or greater, more preferably about 5 percent or greater, and most preferably about 9 percent or greater as measured according to DIN EN ISO 527-1. Preferably, the yield point at 45° C. is about 200 Pa. or greater, more preferably about 250 Pa. or greater, and most preferably about 300 Pa. or greater measured on a Bohlin viscosimeter and calculated after Casson. Preferably, the lap shear strength of a 1.5 mm thick cured adhesive layer is about 15 MPa or greater, more preferably about 20 MPa or greater, and most preferably about 25 MPa or greater measured according to DIN EN 1465. Preferably, the impact peel strength at room temperature of the cured adhesive is about 15 N/mm or greater, more preferably about 20 N/mm or greater, and most preferably about 30 N/mm or greater measured according to ISO 11343.

Molecular weights as quoted herein are weight average molecular weights measured according to GPC analysis using mixed polystyrene as column material, THF as diluent and linear polystyrene as standard at 45° C.

EXAMPLES

The following examples are included for illustrative purposes only and are not intended to limit the scope of the claimed invention. Unless otherwise stated, all percentages and parts are on a weight basis.

Preparation of Toughener A

A 6000 (Mw) molecular weight trifunctional polyether polyol (polypropylene oxide based) is poured into a vessel. 11.1 g of hexamethylene diisocyanate is added and the mixture is heated up to 60° C. Then 0.02 g dibutyltin-dilaurate is added. An exothermic reaction starts, and the temperature increases up to 80-90° C. Stirring is continued until reaction is completed. After the mixture is cooled down to 60° C., 13.5 g 2-allylphenol is added. The solution is stirred at 80° C. for 30 minutes.

Preparation of Toughener B 66.6 g of Polytetrahydrofuran having a molecular weight of approx. 2000 (Mw) are preheated at 90° C. The resulting liquid is then poured into a vessel and 20.7 g of bisphenol A and 0.3 g of trimethylolpropane are added. The resulting suspension is heated up to 140° C. and stirred until all bisphenol A is dissolved. After the mixture is cooled down to 60° C., 12.3 g hexamethylene diisocyanate are added. The mixture is stirred to homogeneity. Then 0.02 g dibutyltin-dilaurate is added. An exothermic reaction is starting, followed by an increase of temperature between 20 and 30° C. up to 90° C. The solution is cooled and stirred for 1 hour to finish the reaction.

Preparation of Toughener C 64.2 g of a 6000 (Mw) molecular weight trifunctional polyether polyol (polypropylene oxide based) is poured into a vessel. 9.5 g of hexamethylene diisocyanate is added, and the mixture is heated up to 60° C. Then 0.02 g dibutyltin-dilaurate is added. An exothermic reaction starts, and the temperature increases up to 80-90° C. Stirring is continued until reaction is completed. The mixture is cooled down to 60° C. and 26.3 g 3-(n-penta-8'-decenyl)phenol is added. The solution is stirred at 80° C. for 30 minutes.

Preparation of the Adhesive 12.5 elastomer modified bisphenol F based epoxy prepolymer, 53.6 g a diglycidyl ether of bisphenol A liquid epoxy resin having an epoxy equivalent weight of approx. 360 (Mw), 12.5 g toughener A, B, or C, are mixed in a laboratory planetary mixture at room temperature for 30 minutes. Then 1.2 g Glycidyl ester of a saturated mono carboxylic acid, 0.7 g glycidyl silyl ether are added and the mixture is stirred at room temperature for another 30 minutes. Then 9.9 g of surface modified fumed silica and 2.9 g polyvinyl butyral are added and stirred at room temperature for 15 minutes. At the end 5.7 g dicyanamide and 0.6 g of Tris(2,4,6-dimethylaminomethyl)phenol in a polymeric matrix are added, and the mixture is stirred for 10 minutes at room temperature. All mixing steps are performed under vacuum.

The adhesive compositions prepared were tested for a variety of properties. Those tests were: lap shear strength (1.5 mm CRS 1403, oil 5103S) according DIN EN 1465, impact peel strength (1.0 mm CRS 1403, oil 5103S) according ISO 11343, Young modulus, elongation and shear strength according DIN EN ISO 527-1.

The results of the testing on the inventive products and comparative products are included in the following table.

| | Toughener | | | |
|---|---|---|---|---|
| | Standard Toughener[1] | Toughener A | Toughener B | Toughener C |
| Mw | 72200 | 51000 | 49900 | 34500 |
| Mn | 32400 | 24300 | 25600 | 31200 |
| polydispersity | 2.2 | 2.1 | 1.9 | 1.1 |
| Viscosity at 40° C. [Pas] | 900 | 60 | 610 | 9 |
| Viscosity at 60° C. [Pas] | 240 | 20 | 180 | 3 |
| Viscosity at 80° C. [Pas] | 80 | 10 | 60 | 1 |

| | Formulation with: | | | |
|---|---|---|---|---|
| | Standard Toughener | Toughener A | Toughener B | Toughener C |
| Lap Shear strength [MPa] | 28 | 28 | 26 | 27 |
| Impact Peel Strength [N/mm] | 41 | 29 | 39 | 30 |
| Young Modulus [MPa] | 1600 | 2100 | 2200 | 2100 |
| Tensile strength [MPa] | 32 | 47 | 51 | 47 |
| Elongation [%] | approx. 10 | 9 | 9 | 6 |
| Viscosity [Pas] | 200 | | 30 | 20 |
| Yield Stress [Pa] | 80 | | 480 | 460 |

[1]Refers to an adhesive as prepared using RAM 965 toughener available from Vantico made according to Example 16 of Mülhaupt U.S. Pat. No. 5,278,257.

Adhesives using tougheners B and C of the invention were tested for streaming on an Intec machine at the following speeds: 150-400 mm per second using a temperature at the nozzle of 40-65° C. and a pressure of from about 50 to about 200 bar. The thread behavior and squeezability were judged to be excellent. The adhesives were applied in a bead of 15 mm×0.4 mm size to a metal substrate.

What is claimed is:

1. A method of preparing a toughening agent comprising toughening compositions comprising the reaction product of one or more isocyanate terminated prepolymers and one or more capping compounds having one or more bisphenolic phenolic, benzyl alcohol, aminophenyl or, benzylamino moieties wherein the reaction product is terminated with the capping compound wherein the process comprises reacting the capping compound with one or more isocyanate terminated prepolymers or a mixture of one or more aliphatic or cycloaliphatic polyisocyanates and a polyether polyol or polyamine at a temperature of 90° C. or less for about 120 minutes or less.

2. A method according to claim 1 wherein the reactants are reacted at a temperature of 80° C. or less.

3. A method according to claim 1 wherein the capping compound corresponds to the formula

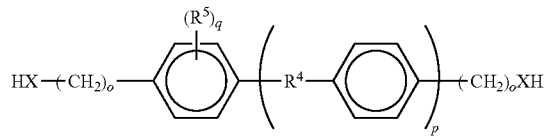

wherein
$R^4$ is a direct bond or an alkylene, carbonyl, oxygen, carboxyloxy or amido moiety;

$R^5$ independently in each occurrence an alkyl, alkenyl, alkyloxy or aryloxy moiety with the proviso that if p=1 then q=0;

X is O or —$NR^6$ the proviso that X is O where p is 1; and that where p is 0, X is O in at least one occurrence;

o is independently in each occurrence 0 or 1 if p is 0, and 0 if p is 1;

p is independently in each occurrence 0 or 1; and q is independently in each occurrence a number of from 0 to 1.

4. A method according to claim 1 wherein the bisphenolic, phenolic, benzyl alcohol, aminophenyl or benzylamino moieties of the capping compound contain one aromatic moiety and one aliphatic substituent on the aromatic ring which does not interfere in the reaction of the amino or hydroxyl groups with an isocyanate groups.

5. A method according to claim 3 wherein the isocyanate terminated prepolymer corresponds to one of the formulas

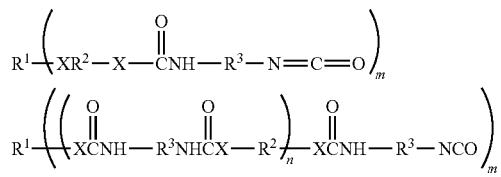

wherein
$R^1$ is independently in each occurrence a $C_{2-20}$ m-valent alkyl moiety;

$R^2$ is independently in each occurrence a polyether chain;

$R^3$ is independently in each occurrence an alkylene, cycloalkylene or mixed alkylene and cycloalkylene moiety;

X is O or —$NR^6$ with the proviso that X is O where p is 1; and that where p is 0, X is O in at least one occurrence;

$R^6$ is independently in each occurrence hydrogen or alkyl;

m is independently in each occurrence a number of 1 to 6; and n is independently in each occurrence a number of 1 or greater.

6. A method according to claim 5 wherein the toughening composition corresponds to one of the formulas

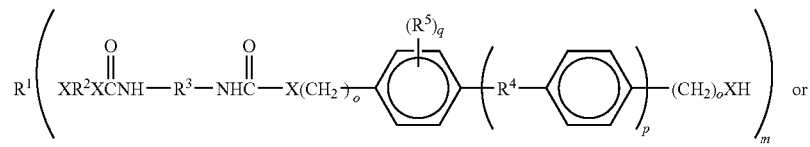

or

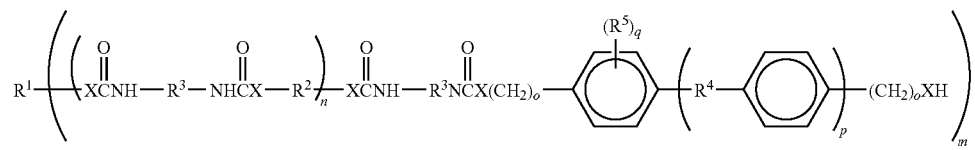

wherein
$R^6$ is independently in each occurrence a $C_{2-20}$ m valent alkyl moiety;

$R^2$ is independently in each occurrence a polyether chain;

$R^3$ is independently in each occurrence an alkylene, cycloalkylene or mixed alkylene and cycloalkylene moiety, optionally containing one or more oxygen or sulfur atoms;

$R^4$ is a direct bond or an alkylene, carbonyl, oxygen, carboxyloxy, or amido moiety;

$R^5$ is independently in each occurrence an alkyl, alkenyl, alkyloxy or aryloxy moiety with the proviso that if p=1 then q=0;

X is or —$NR^6$ with the proviso that X is O where p is 1; that where p is 0, X is O in at least one occurrence;

$R^6$ is independently in each occurrence hydrogen or alkyl;

m is independently in each occurrence a number of about 1 to about 6;

n is independently in each occurrence a number of 1 or greater;

o is independently in each occurrence 0 or 1 if p is 0, and 0 if p is 1;

p is independently in each occurrence 0 or 1; and q is independently in each occurrence a number of from 0 to 1.

7. A method according to claim 6 wherein
$R^1$ is independently in each occurrence a 2 to 3 valent $C_{2-8}$ alkyl moiety;

$R^2$ is a polyalkylene polyether chain having a weight average molecular weight of about 400 to about 4000;

R³ is independently in each occurrence a $C_{2-20}$ alkylene, cycloalkylene or mixed alkylene and cycloalkylene moiety;

R⁴ is a $C_{1-20}$ straight or branched chain alkylene moiety;

R⁵ is independently in each occurrence $C_{1-20}$ alkyl, $C_{2-20}$ alkenyl, $C_{1-20}$ alkoxy or $C_{6-20}$ aryloxy moiety with the proviso that where p is 0, R⁵ is a $C_{1-20}$ alkyl moiety;

R⁶ is independently in each occurrence hydrogen or $C_{1-4}$ alkyl moiety;

m is independently in each occurrence about 2 to about 4;

n is independently in each occurrence about 1 to about 3;

p is independently in each occurrence a number of 0 or 1 and q is 0 or 1.

8. A method according to claim 1 wherein the capping compound is reacted with a mixture of one or more aliphatic or cycloaliphatic polyisocyanates and a polyether polyol.

9. A method according to claim 1 wherein the adhesive composition prepared containing the tougheneing agent has a viscosity at 45° C. of about 20 Pa·s to about 150 Pa·s.

10. A method according to claim 2 wherein the reactants are reacted at a temperature of 80° C. or less.

11. A method according to claim 10 wherein the reactants are reacted for 100 minutes of less.

12. A method according to claim 10 wherein the adhesive composition prepared containing the toughening agent has a viscosity at 45° C. of about 20 Pa·s to about 150 Pa·s.

13. A method according to claim 12 wherein the reactants are reacted at a temperature of 80° C. or less.

14. A method according to claim 13 wherein the reactants are reacted for 100 minutes of less.

* * * * *

UNITED STATES PATENT AND TRADEMARK OFFICE
CERTIFICATE OF CORRECTION

| | | |
|---|---|---|
| PATENT NO. | : 7,557,169 B2 | |
| APPLICATION NO. | : 11/891444 | |
| DATED | : July 7, 2009 | |
| INVENTOR(S) | : Andreas Lutz, Paul Rohrer and Hans Schönbächler | |

It is certified that error appears in the above-identified patent and that said Letters Patent is hereby corrected as shown below:

In column 16, line 38, "$R^6$ is independently in each occurrence a $C_{2-20}$ m valent" should read -- $R^1$ is independently in each occurrence a $C_{2-20}$ m valent --.

In column 16, line 50, "X is or $-NR^6$ with the proviso that X is O where p is 1; that" should read -- X is O or $-NR^6$ with the proviso that X is O where p is 1; that --.

Signed and Sealed this
Twenty-sixth Day of April, 2011

David J. Kappos
*Director of the United States Patent and Trademark Office*